United States Patent
Sato

(10) Patent No.: US 7,067,571 B2
(45) Date of Patent: *Jun. 27, 2006

(54) ANTISTATIC AGENT AND RESIN COMPOSITION AND FORMED PRODUCT

(76) Inventor: Shigekatu Sato, deceased, late of Kawasaki (JP); by Hiroaki Sato, legal representative, 3-7-7, Katahira, Asao-ku, Kawasaki-city, Kanagawa (JP)

( * ) Notice: Subject to any disclaimer, the term of this patent is extended or adjusted under 35 U.S.C. 154(b) by 57 days.

This patent is subject to a terminal disclaimer.

(21) Appl. No.: 10/627,267

(22) Filed: Jul. 24, 2003

(65) Prior Publication Data

US 2004/0132879 A1    Jul. 8, 2004

(51) Int. Cl.
*C08K 5/55*    (2006.01)

(52) U.S. Cl. ............... 524/183; 524/912; 106/287.23; 106/287.26

(58) Field of Classification Search ........... 106/287.23, 106/287.26; 260/DIG. 16; 524/183, 912
See application file for complete search history.

(56) References Cited

U.S. PATENT DOCUMENTS

| | | | | |
|---|---|---|---|---|
| 3,316,287 A | * | 4/1967 | Nunn, Jr. et al. | 558/294 |
| 3,539,529 A | * | 11/1970 | Toshio et al. | 524/182 |
| 3,645,897 A | * | 2/1972 | Gower et al. | 508/158 |
| 3,804,875 A | * | 4/1974 | Ludwig et al. | 558/289 |
| 4,141,851 A | * | 2/1979 | Askew et al. | 252/78.3 |
| 4,298,488 A | * | 11/1981 | Tanizaki et al. | 252/78.1 |
| 4,450,087 A | * | 5/1984 | Askew et al. | 252/73 |
| 5,236,514 A | * | 8/1993 | Leung et al. | 134/22.14 |
| 5,854,324 A | * | 12/1998 | Tajima et al. | 524/232 |
| 5,948,844 A | * | 9/1999 | Oka et al. | 524/399 |
| 6,235,821 B1 | * | 5/2001 | Saito | 524/161 |

FOREIGN PATENT DOCUMENTS

| | | | |
|---|---|---|---|
| GB | 1090565 | * | 11/1967 |
| JP | 61-83293 | * | 4/1986 |
| JP | 2-180941 | * | 1/1989 |
| JP | 04-252287 | * | 9/1992 |

* cited by examiner

*Primary Examiner*—Tatyana Zalukaeva
(74) *Attorney, Agent, or Firm*—Butzel Long

(57) ABSTRACT

An antistatic agent containing a borate ester of polyoxyalklene. An antistatic resin composition comprising a thermoplastic resin and a borate ester of polyoxyalkylene. An antistatic plastic resin formed product made from a plastic resin composition comprising a thermoplastic resin and a borate ester of polyoxyalkylene.

3 Claims, No Drawings

ANTISTATIC AGENT AND RESIN COMPOSITION AND FORMED PRODUCT

BACKGROUND OF THE INVENTION

1. Field of the Invention

The present invention relates to an antistatic agent and an antistatic resin composition and an antistatic resin formed product.

2. Description of the Related Art

Plastics have excellent properties such as easy processability, high productivity, light weight and relative low procuring cost, so they are used for the parts and structural materials for automobile, autobicycle, scooter, television, radio, audio equipment, washing machine, rice cooker, personal computer, portable telephone, game machinery, building materials, office supplies, stationery, toys, sports goods, sports equipment, agricultural tools, marine tools, sheet and film.

They are usually prepared by plastic processing methods such as injection molding, blow molding, compression molding, transfer molding, rotating molding, slush molding, inflation tubular film process, and extrusion molding.

Plastic resins, especially polyethylene or polypropylene which have no polar group in the molecule are strong electrical insulating resistant, resulting in the easy generation of static electricity when similar or different plastic resins are rubbed, consequently they take an electrical charge.

When formed, the plastic resin products take an electrical charge, so that they adsorb the dust in surrounding, resulting not only to make their appearance worse but also to give uncomfortable feeling when workers or users touch them.

Electrical charging sometimes becomes the cause of ignition and occasionally generates troubles of production stoppage owing to the plastic resin formed product's surrounding and to the processing machine at the production step.

Also, electrical charging of the plastic resin formed product gives a bad influence when they are printed, painted or corona discharged.

As a preventing means for electrical discharging, there has been practiced methods such as coating a surface active agent on the surface of the plastic mold or plastic film; mixing a surface active agent by kneading into plastics; immersing the plastic product into a surface active agent solution; or spraying a surface active agent on the plastic product.

There are many kinds of surface active agents such as anionic, nonionic, cationic and amphoionic type.

Anionic type surface active agents are inferior at compatibility with plastics and make the plastics product's transparency worse. Nonionic type surface active agents have better compatibility with plastic than anionic type surface active agents, however nonionic types gradually lose their antistatic effect with the passing of time and nonionic types bleed out from inside of the plastic to the surface of it to cause whitening of the surface, resulting worse the product appearance.

Cationic and amphoionic type surface active agents are inferior at heat resistance causing coloring notwithstanding their good antistatic effect.

The above mentioned problems of each surface active agent are expected to improve. An antistatic agent containing an organic boron compound is disclosed in the Japanese Laid-open Patent 4-252287, the organic boron compound which is obtained by reacting an alcohol residual group contaning compound having two adjacent hydroxyl groups with boric acid or borate ester.

The organic boron compound overcomes short durable terms of antistatic effect and whitening of the surface of plastic molded product by bleeding of the organic boron compound.

SUMMARY OF THE INVENTION

As a result of diligent investigation by the present invention under such situation, the present invention provides an antistatic agent which contains a borate ester of polyoxyalkylene, and an antistatic plastic resin composition, and an antistatic plastic resin formed product.

DETAILED DESCRIPTION OF THE INVENTION

A borate ester of polyoxyalkylene used for the present invention is a chemical compound expressed by the following general formula (1).

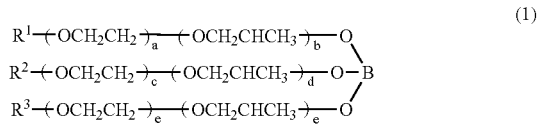

wherein R1, R2 and R3 are independently selected from the group consisting of hydrogen and hydrocarbon groups, a, b, c, d, e and f are positive integers independently selected from 0 to 30 whose sum is from 6 to 80.

Examples of the hydrocarbon group are alkyl groups such as methyl, ethyl, propyl, isopropyl, butyl, pentyl, hexyl, octyl, nonyl, decyl, dodecyl, hexadecyl, octadecyl and docosyl groups and phenyl, tolyl and cyclohexyl groups.

Illustrative of the borate eater of polyoxyalkylene are the chemical compounds expressed by the following chemical formula from (2) to (27).

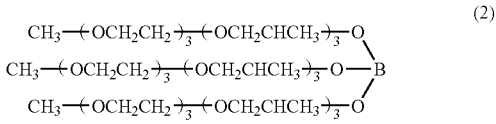

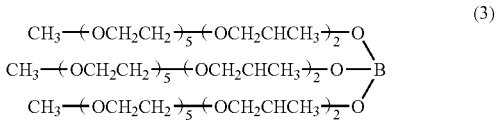

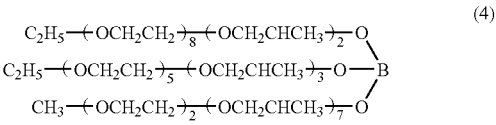

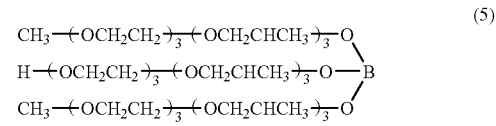

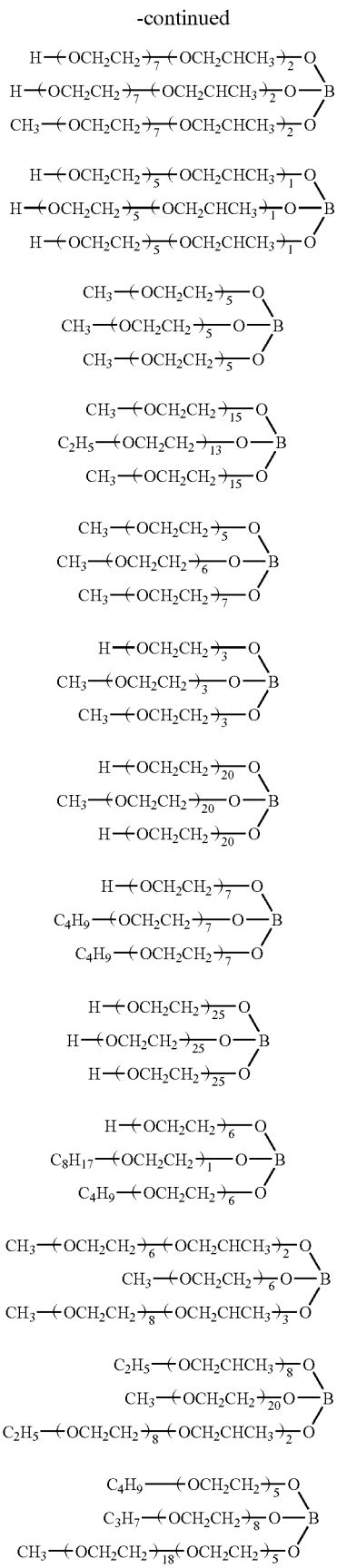
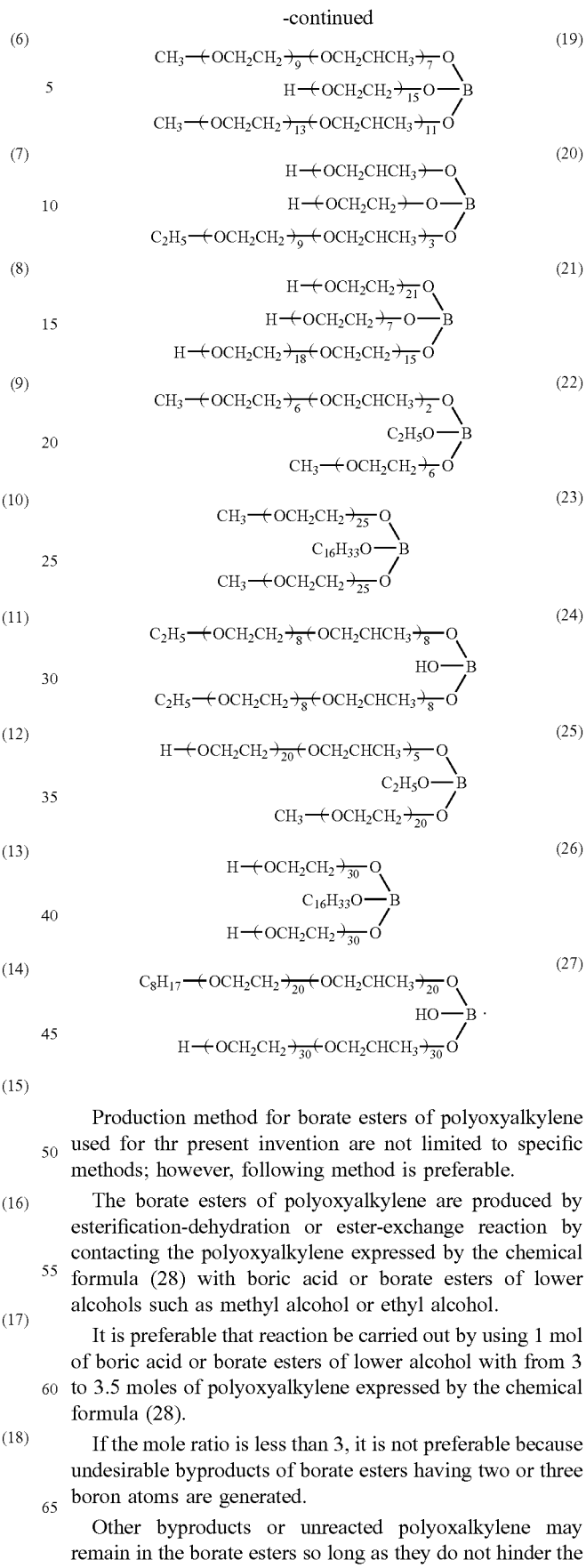

Production method for borate esters of polyoxyalkylene used for thr present invention are not limited to specific methods; however, following method is preferable.

The borate esters of polyoxyalkylene are produced by esterification-dehydration or ester-exchange reaction by contacting the polyoxyalkylene expressed by the chemical formula (28) with boric acid or borate esters of lower alcohols such as methyl alcohol or ethyl alcohol.

It is preferable that reaction be carried out by using 1 mol of boric acid or borate esters of lower alcohol with from 3 to 3.5 moles of polyoxyalkylene expressed by the chemical formula (28).

If the mole ratio is less than 3, it is not preferable because undesirable byproducts of borate esters having two or three boron atoms are generated.

Other byproducts or unreacted polyoxalkylene may remain in the borate esters so long as they do not hinder the purging effect of the resin composition of the present invention.

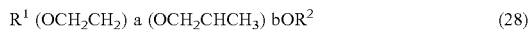  (28)

wherein $R^1$ and $R^2$ are independently selected from the group consisting of hydrogen and hydrocarbon group, a and b are independently selected from 0 to 30.

Examples of hydrocarbon groups are alkyl group such as methyl, ethyl, propyl, isopropyl, butyl, pentyl, hexyl, octyl, nonyl, decyl, dodecyl, hexadecyl, octadecyl and docosyl groups and phenyl, tolyl and cyclohexyl group.

Examples of the polyoxyalkylene expressed by the chemical formula (28) are as follows.
diethylene glycol monomethyl ether,
diethylene glycol monoethyl ether,
diethylene glycol monoisopropyl ether,
diethylene glycol monobuthyl ether,
diethylene glycol monoocthyl ether,
diethylene glycol monodecyl ether,
diethylene glycol monohexadecyl ether,
diethylene glycol monooctadecyl ether,
triethylene glycol monomethyl ether,
triethylene glycol monoethyl ether,
triethylene glycol monoisopropyl ether,
triethylene glycol monobuthyl ether,
triethylene glycol monobuthyl ether,
triethylene glycol monoocthyl ether,
triethylene glycol monodecyl ether,
triethylene glycol monohexadecyl ether,
triethylene glycol monooctadecyl ether,
tetraethylene glycol monomethyl ether,
tetraethylene glycol monoethyl ether,
tetraethylene glycol monoisopropyl ether,
tetraethylene glycol monobuthyl ether,
tetraethylene glycol monoocthyl ether,
tetraethylene glycol monodecyl ether,
tetraethylene glycol monohexadecyl ether,
tetraethylene glycol monooctadecyl ether,
polyethylene glycol monomethyl ether,
polyethylene glycol monoethyl ether,
polyethylene glycol monoisopropyl ether,
polyethylene glycol monobuthyl ether,
polyethylene glycol monoocthyl ether,
polyethylene glycol monodecyl ether,
polyethylene glycol monohexadecyl ether,
polyethylene glycol monooctadecyl ether,
dipropylene glycol monomethyl ether,
dipropylene glycol monoethyl ether,
dipropylene glycol monoisopropyl ether,
dipropylene glycol monobuthyl ether,
dipropylene glycol monoocthyl ether,
dipropylene glycol monodecyl ether,
dipropylene glycol monohexadecyl ether,
dipropylene glycol monooctadecyl ether,
tripropylene glycol monomethyl ether,
tripropylene glycol monoethyl ether,
tripropylene glycol monoisopropyl ether,
tripropylene glycol monobuthyl ether,
tripropylene glycol monoocthyl ether,
tripropylene glycol monodecyl ether,
tripropylene glycol monohexadecyl ether,
tripropylene glycol monooctadecyl ether,
tetrapropylene glycol monomethyl ether,
tetrapropylene glycol monoethyl ether,
tetrapropylene glycol monoisopropyl ether,
tetrapropylene glycol monobuthyl ether,
tetrapropylene glycol monoocthyl ether,
tetrapropylene glycol monodecyl ether,
tetrapropylene glycol monohexadecyl ether,
tetrapropylene glycol monooctadecyl ether,
polypropylene glycol monomethyl ether,
polypropylene glycol monoethyl ether,
polypropylene glycol monoisopropyl ether,
polypropylene glycol monobuthyl ether,
polypropylene glycol monoocthyl ether,
polypropylene glycol monodecyl ether,
polypropylene glycol monohexadecyl ether,
polypropylene glycol monooctadecyl ether,
diethyleneglycol tripropyleneglycol monomethyl ether,
tetraethyleneglycol dipropyleneglycol monomethyl ether,
tetraethyleneglycol tripropyleneglycol monomethyl ether,
tetraethyleneglycol tetrapropyleneglycol monomethyl ether,
pentaethyleneglycol dipropyleneglycol monomethyl ether,
pentaethyleneglycol tripropyleneglycol monomethyl ether,
diethyleneglycol tetrapropyleneglycol monomethyl ether,
hexaethyleneglycol dipropyleneglycol monomethyl ether,
hexaethyleneglycol dipropyleneglycol monomethyl ether,
hexaethyleneglycol tripropyleneglycol monomethyl ether,
hexaethyleneglycol tetrapropyleneglycol monomethyl ether,
hexaethyleneglycol pentapropyleneglycol monomethyl ether,
hexaethyleneglycol hexapropyleneglycol monomethyl ether,
heptaethyleneglycol dipropyleneglycol monomethyl ether,
heptaethyleneglycol dipropyleneglycol monomethyl ether,
heptaethyleneglycol tripropyleneglycol monomethyl ether,
heptaethyleneglycol tetrapropyleneglycol monomethyl ether,
heptaethyleneglycol pentapropyleneglycol monomethyl ether,
heptaaethyleneglycol hexapropyleneglycol monomethyl ether,
heptaaethyleneglycol heptapropylenegly-col monomethyl ether,
octaethyleneglycol dipropyleneglycol monomethyl ether,
octaethyleneglycol tripropyleneglycol monomethyl ether,
octaethyleneglycol tetrapropyleneglycol monomethyl ether,
octaethyleneglycol pentapropyleneglycol monomethyl ether,
octaethyleneglycol hexapropyleneglycol monomethyl ether,
octaethyleneglycol heptapropyleneglycol monomethyl ether,
polyethyleneglycol polypropyleneglycol monomethyl ether,
triethylene glycol,
tetraethylene glycol,
pentaethylene glycol,
hexaethylene glycol,
heptaethylene glycol,
octaethylene glycol,
decaethylene glycol,
tridecaethylene glycol,
hexadecaethylene glycol,
eicosaethylene glycol,
pentacosaethylene glycol,
triacosaethylene glycol,
tripropylene glycol,
tetpropylene glycol,
pentapropylene glycol,
hexapropylene glycol,
heptapropylene glycol,
octapropylene glycol,
decapropylene glycol,
tridecapropylene glycol,
hexadecapropylene glycol, eicosapropylene glycol,
pentacosapropylene glycol,
triacosapropylene glycol,
triethylene glycol tripropylene glycol,
tetraethylene glycol dipropylene glycol,
tetraethylene glycol tripropylene glycol,
tetraethylene glycol tetrapropylene glycol,
pentaethylene glycol dipropylene glycol,
pentaethylene glycol tripropylene glycol,
hexaethylene glycol dipropylene glycol,
hexaethylene glycol tripropylene glycol,
hexaethylene glycol pentapropylene glycol,
hexaethylene glycol hexapropylene glycol,
heptaethylene glycol dipropylene glycol,
triacosaethylene glycol dipropylene glycol,
heptaethylene glycol tripropylene glycol,
heptaethylene glycol tetrapropylene glycol,
heptaethylene glycol pentapropylene glycol,
heptaethylene glycol hexapropylene glycol,
heptaethylene glycol heptapropylene glycol,
octaethylene glycol dipropylene glycol,
octaethylene glycol tripropylene glycol,
octaethylene glycol tetrapropylene glycol,
octaethylene glycol pentapropylene glycol,
octaethylene glycol hexapropylene glycol,
octaethylene glycol pentapropylene glycol,
octaethylene glycol octapropylene glycol,
polyethylene glycol polypropylene glycol,
tripropylene glycol triethylene glycol monomethyl ether,
tetrapropylene glycol diethylene glycol monomethyl ether,
tetrapropylene glycol triethylene glycol monomethyl ether,
tetrapropylene glycol tetraethylene glycol monomethyl ether,
pentapropylene glycol diethylene glycol monomethyl ether,
pentapropylene glycol triethylene glycol monomethyl ether,
pentapropylene glycol tetraethylene glycol monomethyl ether,
hexapropylene glycol diethylene glycol monomethyl ether,
hexapropylene glycol triethylene glycol monomethyl ether,
hexapropylene glycol tetraethylene glycol monomethyl ether,
hexapropylene glycol pentaethylene glycol monomethyl ether,
hexapropylene glycol hexaethylene glycol monomethyl ether,
heptapropylene glycol diethylene glycol monomethyl ether,
heptapropylene glycol triethylene glycol monomethyl ether,
heptapropylene glycol tetraethylene glycol monomethyl ether,
heptapropylene glycol pentaethylene glycol monomethyl ether,
heptapropylene glycol hexaethylene glycol monomethyl ether,
heptapropylene glycol heptaethylene glycol monomethyl ether
octapropylene glycol diethylene glycol monomethyl ether,
octapropylene glycol triethylene glycol monomethyl ether,
octapropylene glycol tetraethylene glycol monomethyl ether,
octapropylene glycol pentaethylene glycol monomethyl ether,
octapropylene glycol hexaethylene glycol monomethyl ether,
octapropylene glycol heptaethylene glycol monomethyl ether
octapropylene glycol octaethylene glycol monomethyl ether
polypropylene glycol polyethylene glycol monomethyl ether
tripropylene glycol triethylene glycol monomethyl ether,
tetrapropylene glycol triethylene glycol monomethyl ether,
tripropylene glycol triethylene glycol monomethyl ether,
octapropylene glycol diethylene glycol monomethyl ether,
octaethylene glycol dipropylene glycol monomethyl ether,
octaethylene glycol tripropylene glycol monomethyl ether,
octaethylene glycol tetrapropylene glycol monomethyl ether,
octaethylene glycol pentapropylene glycol monomethyl ether,
octaethylene glycol hexapropylene glycol monomethyl ether,
octaethylene glycol heptapropylene glycol monomethyl ether,
octaethylene glycol octapropylene glycol monomethyl ether,
polyethylene glycol polypropylene glycol monomethyl ether.

A solvent or diluent may be incorporated into the raw materials such as boric acid, borate ester of lower alcohols and polyoxyalkylene, or into borate esters of glycol ether.

If a solvent or diluent are employed, they must not disturb the esterification-dehydration or ester-exchange reaction and their boiling points should preferable be below the boiling point of the byproducts or polyoxyalkylenes.

Examples of solvents or diluents are ethers such as diethyl ether, dioxane, tetrahydrofran; aliphatic hydrocarbons such as hexane, acetic anhydride, heptane, octane, nonane, decane, undecane; aromatic hydrocarbons such as benzene, toluene, xylene; cycloalkanes such as cyclohexane, cyclohexene; non-proton polar compounds such as dimethy formamide, dimethyl sulfoxide, hexamethyl polyamide phosphate, acetonitrile, N-methylpyrrolidone; and their chlorine substituted compounds such as chloroform and carbon tetrachloride.

A catalyst for the esterification-dehydration or ester-exchange reaction may be used.

If a catalyst is necessary for promoting the reaction, following condensation catalysts are recommended.

Examples of the catalysts are metallic salts of organic acids such as ferrous octanoate, ferrous naphthenate, cobaltous naphthenate, manganese octanoate, stannum octanoate, stannum naphthenate, lead octanoate, lead naphthenate, organotin compounds such as dibuthy tin diacetate, dibuthyl tin dioctanoate, dibutyl tin dilaurate, dibutyl tin dioleate, dibutyl tin dimethoxide, oxidized dibutyl tin; metal alcoholates such as tetrabuthyl titanate, tetrabutyl zirconate; titanium chelates such as di-isopropoxy bis-acetylacetonate titanium, 1, 3-propanedioxy bis-ethylacetonate titanium, 1, 3-propa-nedioxy bis-ethylacetoacenate titanium; aluminum chelates such as aluminum acethyl-acetonate, aluminum tris-ethylacetoacetonate; amines such as hexyl amine, dodecylamine phosphate, dimethyl hydroxyamine, diethyl hydroxyamine; tetra-ammonium salts such as benzyl hydroxyamine; inorganic acids such as hydrochlonic acid, nitric acid, sulfric acid, phosphoric acid; organic acids such as acetic anhydride, pure acetic acid (over 99.8%), propionic acid, citric acid, benzoic acid, formic acid, acetic acid, oxalic acid, p-toluenesulfonic acid; chlorosilanes such as methyl tri-chlorosilane, dimethyl di-chlorosilane; inorganic bases such as aqueous ammonia; organic bases such as ethylene diamine, tri-ethanol amine; and amino alkylamine.

It is preferable that the esterification-dehydration or ester-exchange reaction is carried out under conditions of reduced or atmospheric pressure, from 50 to 250° C. temperature, and preferably from 100 to 180° C.

During the reaction, removal of byproducts such as lower alcohols or water can proceed the reaction easily because removal of byproducts proceeds the reaction equilibrium to favor borate ester of polyoxyalkylene formation.

As to the removal method, azeotropic distillation using azeotropic agent and batch or continuous distillation using distillation tower are preferable.

For the purpose of improving the properties of the borate ester of polyoxyalkylenes, amino group containing compounds and/or solvents may be added to the borate esters of polyoxyalkylenes.

Adding the amino-group containing compounds to the borate esters of polyoxyalkylenes causes suppression of borate ester hydrolysis and also a rust preventive effect under the condition of existense of water or its vapor.

Examples of the amino-group containing compounds include alkylamine, cyclo alkyl amine, alkanol amine, heterocyclic amine, diamine, lactam, cyclic imide and polyamine, which may be used alone or combination.

As the alkyl amine, there can be used methyl amine, dimethyl amine, trimethyl amine, ethyl amine, diethyl amine, triethyl amine, propyl amine, N, N-di[poly(4)oxyethyl] hexadecyl amine, dodecyl dimethyl amine, stearamide propyl dimethyl amine, polyoxyethylene(3-30)octadecyl amine, polyoxyethylene(3-30) laurylamine, polyoxyethylene(3-30) oleyl amine,polyox-yethylene(3-30) dilauryl amine, polyoxyet-hylene (3-30) stearyl amine, poly-oxyethylene (3-30)alkylamine,polyoxyethylene(3-30)dialkyl amine, and di(oleoyloxyethyl) hydroxy amine.

As the cycloalkyl amine, there can be used cyclohexyl amine, methyl cyclohexyl amine and ethyl cyclohexyl amine.

As the alkanol amine, there can be used ethanol amine, diethyl hydroxy methyl amine, diethanol amine, dimethyl aminoethanol, triethanol amine, propanolamine, dimethy 2-hydroxypropyl amine, buthanol amine, methyldi(2-hydroxyethyl) amine, tri(2-hydroxyethyl)amine, hydroxymethyl di(2-hydroxyethyl)amine, dibenzil 2-hyd-roxypropyl amine and cyclohexyl di(2-hydroxyethyl) amine.

As the cycloalkanol amine, there can be used cyclohexanol amine, methylcyclohexanol amine and ethylcyclohexanol amine.

As the heterocyclic amine, there can be used used pyridine, lutidine, 3,4-xylidine,piperidine, N-methyl piperidine and N-ethyl piperidine.

As the lactam, there can be used proio lactam, N-methylpropyo lactam, N-ethyl butyro lactam, N-methyl varero lactam, N-methyl caprolactam and phenyl caprolactam. As the cyclic imide, there can be used succinimide, N-methyl succinimide, N-ethyl succinimide, phenyl succinimide and 2-undecyl imidazoline.

As the diamine, there can be used ethylene diamine, triethylene diamine and tetraethylene diamine.

As the polyamine, there can be used diethylene triamine, triethylene tetramine and pentaethylene pentamine.

Among these amino-group containing compounds, tertiary amino-group containing compounds exhibit excellent effects of preventing hydrolysis of borate ester of polyoxyalkylene and promoting the cleaning and purging the coloured contaminants.

Examples of tertiary amino-group containing compounds having above mentioned excellent properties are polyoxyethylene(3-30)octadecyl amine, polyoxyethylene (3-30)laurylamine, polyoxyethylene (3-30)oleyl amine,polyox-yethylene (3-30) dilauryl amine, polyoxyethylene (3-30) stearyl amine, polyoxyethylene (3-30)alkylamine, polyoxyethylene (3-30) dialkyl amine and di(oleoyloxyethyl) hydroxy amine.

The amount of amino-group containing compound to 100 parts by weight of borate ester of polyoxyalkylene is from 0 to 100 parts by weight, and preferably from 5 to 50 parts by weight and most preferably from 10 to 30 parts by weight.

Use of the solvent contributes to lower viscosity of the borate ester of polyoxyalkylene. As the solvent, there can be used water, methyl alcohol, ethyl alcohol, isopropyl alcohol, butyl alcohol, isopropyl ether, ether, ethylene glycol, polyethylene glycol, polyethylene dimethyl ester, diethylene glycol, triethylene glycol, ethylene glycol dimethyl ether, diethylene glycol dimethy ether, diethylene glycol diethy ether, ethylene glycol dipropyl ether, triethylene glycol dimethyl ether, triethylene glycol monobuthyl ether, diethylene glycol monobutyl ether, diethylene glycol diethyl ether, diethylene glycol propyl ether, diethylene glycol dibuthyl ether, dimethyl ether, propylene glycol, acetone, methyethyl ketone, furfural, dioxane, methane sulfonate, diethy ether, tetra hydrofuran, hexane, acetic anhydride, heptane, octane, nonane, decane, undecane, benzene, toluene, xylene, cyclohexane, cyclohexene, dimethyl formamide, dimethy sulfoxide, hexamethyl triamide phosphate, acetonitrile, N-methylpyrrolidone, chloroform and carbon tetrachloride. These solvents can be used by alone or in combination.

The amount of solvent to 100 parts by total weight of borate ester of polyoxyalkylene and amino-group containing compound is from 0 to 100 parts by weight, and preferably from 5 to 50 parts by weight and most perferably from 10 to 30 parts by weight.

Ingredients other than amino-group containing compounds and/or solvents may be incorporated to the borate esters of polyoxyalkylenes for the purpose of improving the properties of cleaning and purging the resin compound of the present invention.

Other ingredients can be used such as stabilizers, neutralizers, antioxidants, ultraviolet absorbers, light stabilizers, antistatic agents, lubricants, processability improving agents, fillers, dispersing agents, coupling agents, anti-copper rusting agents, blowing agent, nuclear forming agents, anti-forming agents, deformers, colorants, pigments, dyeing agents, carbon blacks, water tree preventing agents, voltage stabilizers, anti-tracking agents, organic peroxides, crosslinking agents, disinfectants, antiseptics, anti-mold agents and anti-rust agents.

The antistatic agent of the present invention is a chemical compound having the function to prevent following problems.

One problem is that the dusts in the area surrounding the plastic resin formed product are adsorbed on the formed products, resulting in not only making their appearance worse but also creating an uncomfortable feeling when workers or users touch the formed products.

The other problem is electrical charging which causes ignition or production stoppage, which is caused when the plastic resin formed products contact the parts of a processing machine at the production step.

Another problem effects surface treating of the plastic products and causes problems associated with printing, painting or corona discharging.

The antistatic agent of the present invention is prepared using one or more than one kind of borate esters of polyoxyalkykenes.

The antistatic agent may contain amino-group containing compounds and/or solvents.

The antistatic agent may further contain surface active agents, pigments, dyes, inorganic fillers, dripping prevention agents, precipitation prevention agents, antioxidants and deformers.

The antistatic agent may be filled in an aerosol container with a propellant.

Coating of the antistatic agent of the present invention on the surface of plastic molded products, plastic films, machine parts, apparatus or process machines can be conducted by brushing, spraying, dipping of the antistatic agent; or contacting a woven cloth or a nonwoven cloth which are immersed in the antistatic agent to the surface of the plastic molded products, plastic films, machine parts, apparatus and process machines.

The antistatic agent of the present invention can be heat kneaded into a plastic resin to form an antistatic plastic resin composition.

The antistatic plastic resin composition can be formed by a plastic processing machine to obtain a plastic film, sheet, bottle or container having antistatic properties.

The plastic resin used for the plasticresin composition of present invention is a thermoplastic resin.

As the thermoplastic resin, there can be used high density polyethylene, high pressure low density polyethylene such as HP-LDPE, EVA, EEA, Ionomer, olefin vinyl alcohol copolymer, LLDPE, VLDPE, polypropylene(PP), polystylene(PS), acrylonitrile-butadiene-styrene copolymer (ABS), acrylonitrile-styrene copolymer (AS), acrylonitrile-butadiene copolymer, acrylonitrile acrylate-stylene copolymer, polyvinyl chloride(PVC), polyamide, poly-methylmethacrylate (PMMA), polyacetal (POM), aminopolyacrylamide, polyarylate, fluorocarbon resin, polyimide(PI), polyaminobismaleimide (PABI), polyamideimide(PAI), polyetherimide (PEI), bismaleimidetriazine resin(BT), polysulfone, polybutylene terephthalate(PBT), polyethylene terephthalate (PET), polyvinylidene chloride, polycarbonate(PC), polyvinyl acetate, polyvinyl alcohol, polyvinyl ether, polyvinyl formale, modified PPE, modified polyphenyleneoxide (PPO), polyphenylenesulfide (PPS), polyethersulfone (PESF), polyetheretherketone (PEEK), polyarysulfone (PAS), polymethylpenten (TPX), liquidcrystal polymer, silicone resin, natural rubber (NR), butyl rubber (IIR), acrylonitrile butadiene rubber (NBR), chloroprene rubber (CR), styrene butadiene rubber (SBR), butadiene rubber (BR) and the like.

Production of the antistatic resin composition is not limited to a specific method; however, following method is desirable.

To 100 parts by weight of a themoplastic resin, 0.1~10 parts by weight of a borate ester of glycol ether expressed by general formula (1) is added.

The form of the thermoplastic resin may be a powder or pellet form.

The borate ester of polyoxyalkylenes may be soaked into the thermoplastic resin powder or pellet.

It is desirable to conduct the soaking at a temperature greater than the glass transition point to speed up the soaking.

The other production method for the antistatic resin composition of the present invention may be conducted as follows.

The thermoplastic resin and borate ester of polyoxyalkylenes are fed to plastic processing machine or bunbury mixer, in which they are blended and extruded through a pelletizing die having many holes of 3~7 mm diameter.

Each of the extruded strings are cut to form pellets having a length of 3~7 mm.

In case the amount of the borate ester of polyoxyalkylenes is less than 0.1 parts by weight, the resin composition for purging does not exhibit the cleaning and purging effect and having the amount of the borate ester of polyoxyalkylenes more than 10% parts by weight is not desirable because a uniform polymer blend is barely obtained.

EXAMPLES

Now, an antistatic agent containing a borate ester of polyoxyalkylene, and an antistatic plastic resin composition, and an antistatic plastic resin formed product according to the present invention will be described in further detail with reference to specific examples. However, it should be understood that the present invention is by no means restricted by such specific examples.

Example 1

Borate ester of polyoxyalkylenes expressed by chemical formula (12) was obtained by the following synthesis process.

In a 7000 ml flask equipped with three inlet pipes and displaced by nitrogen gas were charged 146 g (1 mole) of triethyl borate [$B(OC_2H_5)_3$], 1.2 g of dibutyl tin dilaurate and 50 ml of benzene.

Subsequently, to the solution in the flask was added with 1796 g (2 mole) of eicosaethylenglycol and 912 g (1 mole) of eicosaethylenglycol monomethyl ether under stirring conditions to obtain a uniform blended solution.

Subsequently, the solution in the flask was stirred for 13 hours at 95° C. under distillation conditions to remove ethanol and benzene as the byproduct and to obtain 2716 g (0.99 mole) of a borate ester of polyoxyalkylenes expressed by chemical formula (12).

Also, the other borate ester of polyoxyalkylenes expressed by chemical formula (23) was obtained by following synthesis process.

In a 7000 ml flask equipped with three inlet pipes and displaced by nitrogen gas were charged 2264 g (2 mole) of pentacosaethylenglycol and 242 g (1 mole) of pentadecanol under stirring conditions to obtain a uniform blended solution.

Subsequently, the solution in the flask was stirred for 13 hours at 95° C. under distillation conditions to remove a ethanol and benzene as the byproduct and to obtain 2514 g (0.99 mole) of a borate ester of polyoxyalkylenes expressed by chemical formula (23).

Then, an antistatic agent(1)consisting 50 parts by weight of borate ester of polyoxyalkylenes expressed by chemical formula (12) and 50 parts by weight of borate ester of polyoxyalkylenes expressed by chemical formula (23) and 15 parts by weight of triethylamine was prepared by mixing the above three components.

In a vessel, 100 parts by weight of a high pressure low density polyethylene (made by Nippon Unicar Company Ltd., melt mass flow rate 10.0 g/10 min., density 0.923 g/cm3) and 0.2 parts by weight of the antistatic agent (1) obtained by the above mentioned method were blended for 5 minutes under room temperature to obtain a mixture. The mixture was thrown into a continuous blending extruder (made by K. C. K. Company Ltd., machine name K. C. K 80×2-35 VEX type) under conditions of acylinder temperature of 190° C. to form the resin composition into pellets having length of 3 mm and diameter of 3 mm.

The resin composition was named hearafter antistatic resin composition (1).

Then a tubular film having a thickness of 50 μm was prepared using the antistatic resin composition(1) by an air cooling inflation film processing machine.

The tubular film was named hereafter antistatic tubular film (1).

Subsequently, the antistatic effect evaluation test was conducted by the following procedures.

The tubular film (1) was left on a table under conditions of 23° C. temperature and 50% RH (Relative Humidity) for three days, then the surface resistivity of the tubular film(1) was measured according to Japanese Industrial Standard K 6911 to find $7.21 \times 10^{11} \Omega$ resistivity for outer surface and $1.28 \times 10^{12} \Omega$ resistivity for inner surface, which are excellent values compared to that of comparative example 1 as shown below.

The half-life of electrostatic voltage for the tubular film(1) was measured according to Japanese Industrial Standard L1094 to find 1.43 sec. for outer surface of the film and 1.92 sec. for inner surface of the film, which are excellent values compared to that of comparative example 1 as shown below.

When 30 days had passed from the day that resistivity and half-life of electrostatic voltage were measured, the same tests were conducted to find $9.75 \times 10^{11} \Omega$ resistivity for the outer surface and $4.08 \times 10^{12} \Omega$ resistivity for the inner surface, which were excellent values compared to comparative example and to find 2.51 sec. half-life of electrostatic voltage for the outer surface and 3.11 sec. half-life of electrostatic voltage for the inner surface, which were excellent values compared to that of comparative example 1 as shown below.

Comparative Example 1

As an example of conventional type antistatic agent (2), 2 mol of etyleneoxide added stearylamine was prepared.

In a vessel, 100 parts by weight of a high pressure low density polyethylene (made by Nippon Unicar Company Ltd., melt mass flow rate 10.0 g/10 min., density 0.923 g/cm3) and 0.2 parts by weight of a conventional type antistatic agent (2) were blended for 5 minutes under room temperature to obtain a mixture, then the mixture was thrown into a continuous blending extruder(made by K. C. K. Company Ltd., machine name K. C. K 80×2–35 VEX type) under conditions of a cylinder temperature of 190° C. to form the resin composition into a pellet having a length of 3 mm and a diameter of 3 mm.

The resin composition was named hearafter antistatic resin composition (2).

Then a tubular film having a thickness of 50 μm was prepared using antistatic resin composition (2) and an air cooling inflation film processing machine.

The tubular film was named hearafter antistatic tubular film (2).

Subsequently, the antistatic effect evaluation test was conducted by following procedures.

The tubular film (2) was left on a table under conditions of 23° C. temperature and 50% RH(Relative Humidity) for three days. Then the surface resistivity of the tubular film (2) was measured according to Japanese Industrial Standard K 6911 to find $8.65 \times 10^{11} \Omega$ resistivity for outer surface and $2.45 \times 10^{12} \Omega$ resistivity for inner surface, which are inferior values compared to that of example 1 as shown above.

The half-life of electrostatic voltage for the tubular film (2) was measured according to Japanese Industrial Standard L 1094 to find 9.45 sec. for the outer surface and 10.87 sec. for the inner surface, which are inferior values compared to that of example 1 as shown above.

Example 2

Borate ester of polyoxyalkylenes expressed by chemical formula (8) was obtained by the following synthesis process.

In a 7000 ml flask equipped with three inlet pipes and displaced by nitrogen gas were charged 146 g (1 mole) of triethyl borate $[B(OC_2H_5)_3]$, 1.2 g of dibutyl tin dilaurate and 50 ml of benzene.

Subsequently, to the solution in the flask was added with 756 g (3 mole) of pentylethylenglycol monomethyl ether under stirring conditions to obtain uniform blended solution.

Subsequently, the solution in the flask was stirred for 13 hours at 95° C. under distillation conditions to remove ethanol and benzene as the byproduct and to obtain 758 g (0.99 mole) of a borate ester of polyoxyalkylenes expressed by chemical formula (8).

Then, an antistatic agent (3)consisting 1 parts by weight of borate ester of polyoxyalkylenes expressed by chemical formula (8) and 1 parts by weight of polyoxyethylene (9) lauryl amine were prepared by mixing the above two components.

In a vessel, 100 parts by weight of a high pressure low density polyethylene (made by Nippon Unicar Company Ltd., melt mass flow rate 10.0 g/10 min., density 0.923 g/cm 3) and 0.2 parts by weight of the antistatic agent (3) obtained by above mentioned method were blended for 5 minutes under room temperature to obtain a mixture. The mixture was thrown into a continuous blending extruder(made by K. C. K. Company Ltd., machine name K. C. K 80×2–35 VEX type) under conditions of a cylinder temperature of 190° C. to form the resin composition into pellets having a length of 3 mm and a diameter of 3 mm.

The resin composition was named hereafter antistatic resin composition (3).

Then a tubular film having a thickness of 50 μm was prepared using antistatic resin composition (3) and an air cooling inflation film processing machine.

The tubular film was named hearafter antistatic tubular film (3). Subsequently, the antistatic effect evaluation test was conducted by the following procedures.

The tubular film (3) was left on a table under conditions of 23° C. temperature and 50% RH(Relative Humidity) for three days. Then the surface resistivity of the tubular film (3) was measured according to Japanese Industrial Standard K 6911 to find $5.78 \times 10^{11} \Omega$ resistivity for the outer surface and $0.97 \times 10^{12} \Omega$ resistivity for the inner surface, which are excellent values compared to that of example 1.

The half-life of electrostatic voltage for the tubular film (3) was measured according to Japanese Industrial Standard L 1094 to find 1.18 sec. for the outer surface and 1.76 sec. for the inner surface, which are excellent values compared to that of example 1.

When 30 days had passed from the day that resistivity and half-life of electrostatic voltage were measured, the same tests were conducted to find $7.67 \times 10^{11} \Omega$ resistivity for the outer surface and $3.89 \times 10^{12} \Omega$ resistivity for the inner surface, which are excellent values compared to example 1 and to find 2.12 sec. half-life of electrostatic voltage for the outer surface and 2.69 sec. half-life of electrostatic voltage for the inner surface, which are excellent values compared to that of example 1.

The experimental results show that the antistatic agent of the present invention had excellent properties and that its surface resistivity was a low value and its half-life of electrostatic voltage was a short time.

Low surface resistivity of the plastic film means that the plastic film will hardly be charged with static electricity, so that the plastic film will not adsorb the dust in surrounding areas.

Short half-life of electrostatic voltage means that the durable term of the antistatic effect of the plastic film is long.

lso, the surface of the plastic film made by the resin compound of the present invention does not provide a sticky touch feeling.

The invention claimed is:

1. An antistatic agent comprising a borate ester of polyoxyalkylene expressed by the following formula (1)

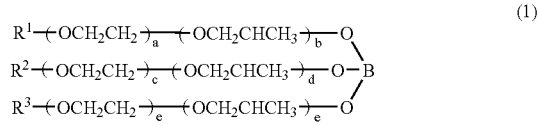

wherein $R^1$, $R^2$ and $R^3$ are independently selected from the group consisting of hydrogen and a hydrocarbon group, and wherein a, b, c, d, e and f independently are integers from 0 to 30 with the proviso that the sum of a+b+c+d+e+f is from 6 to 80 and wherein the antistatic agent further comprises an amino-group containing compound.

2. An antistatic plastic resin composition comprising:
   (A) 100 parts by weight of a thermoplastic resin;
   (B) 0.1–10 parts by weight of an antistatic agent according to claim 1; and
   (C) 0.1–10 parts by weight of the amino-group containing compound.

3. An antistatic plastic resin formed product comprising said antistatic plastic resin composition described in claim 2.

* * * * *